United States Patent [19]

Frazzini et al.

[11] Patent Number: 5,235,274
[45] Date of Patent: Aug. 10, 1993

[54] PULSED EXCITATION POSITION SENSOR SYSTEM USING LINEAR VARIABLE DIFFERENTIAL TRANSDUCERS WITH MULTIPLEXING

[75] Inventors: Ronald M. Frazzini, Plymouth; Rick M. Solosky, Brooklyn Park, both of Minn.

[73] Assignee: Honeywell Inc., Minneapolis, Minn.

[21] Appl. No.: 772,308

[22] Filed: Oct. 7, 1991

[51] Int. Cl.$^5$ .................. G01B 7/14; G08C 15/06; G08C 19/08
[52] U.S. Cl. ................... 324/207.12; 324/207.18; 318/657; 340/870.13; 340/870.36
[58] Field of Search ............ 324/207.12, 207.17, 324/207.18, 207.19, 207.25, 239–241; 318/657–660; 340/870.13, 870.35, 870.36; 370/112

[56] References Cited

U.S. PATENT DOCUMENTS

| | | | |
|---|---|---|---|
| 4,455,555 | 6/1984 | Symonds et al. | 340/870.36 X |
| 4,575,677 | 3/1986 | Dennis | 324/166 X |
| 4,857,919 | 8/1989 | Braswell | 324/207.17 X |
| 4,896,110 | 1/1990 | Shimizu et al. | 324/207.18 |
| 4,937,523 | 6/1990 | Duverger et al. | 324/207.18 |
| 4,977,372 | 12/1990 | Eisenberger et al. | 324/166 |
| 4,982,156 | 1/1991 | Lewis et al. | 340/870.36 |
| 5,066,911 | 11/1991 | Hulsing, II | 324/207.12 X |

Primary Examiner—Gerard R. Strecker
Attorney, Agent, or Firm—Ronald E. Champion

[57] ABSTRACT

A device for measuring the position of an element utilizing a linear variable differential transducer. The primary of the transducer is excited by using a single pulse, causing an induced pulse to be created at the secondary coil. The induced pulse is compensated for the effects of distortion. The induced pulse is sampled and compared with the input pulse to determine the amount of attenuation caused by the transducer, from which the position of an element attached to the transducer can be calculated.

8 Claims, 3 Drawing Sheets

PULSED EXCITATION POSITION SENSOR SYSTEM USING LINEAR VARIABLE DIFFERENTIAL TRANSDUCERS WITH MULTIPLEXING

FIELD OF THE INVENTION

The present invention involves a device for measuring the position of elements. Specifically, the movable core of a variable differential transformer is connected to the element and electronic circuitry is used to determine the position of the core and thereby the position of the element.

BACKGROUND OF THE INVENTION

The present invention relates to circuitry used with a linear variable differential transducer (LVDT) to sense the position of some element. Specifically the invention provides circuitry and a method to sense the position of an element which is efficient, accurate, and uses small amounts of power.

To sense physical position of different elements it is common place to utilize a linear variable differential transducer (LVDT), which typically has a primary coil, a secondary coil and a core member that magnetically couples the primary coil to the secondary coil. The amount of magnetic coupling is dependent upon the position of the core within the transducer. By measuring the amount of magnetic coupling between the primary coil and the secondary coil, the position of the core member can be determined. Similarly, when the core member is attached to some element, the position of that element can also be determined by measuring the amount of magnetic coupling between the primary and secondary coils.

To measure the amount of coupling between the primary coil and the secondary coil, the primary coil is excited by an AC signal, which creates an induced AC signal on the secondary coil. The induced AC signal on the secondary coil is then measured and compared with the AC signal used to excite the primary coil. The ratio of the induced AC signal at the secondary coil to the excitation signal is indicative of the amount of magnetic coupling provided by the core member. Since the amount of magnetic coupling provided by the core member is related to the position of the core member, the ratio indicating magnetic coupling is also indicative of the element attached to the core member.

Constant excitation of the primary coil by an AC signal creates problems. Specifically, a high amount of power is used due to constant excitation of the primary coil. Additionally, problems with cross modulation signals can become very severe when AC signals are utilized.

Recently square wave pulses have been used to excite the LVDT primary, along with appropriate time delays to eliminate the problems of noise associated with AC excitation. In this method of LVDT sampling a square wave is used to drive the transformer primary, and a delay time is allowed to pass before the signal at the secondary is measured. This delay allows the signal at the secondary to stabilize sampling.

Typically, sampling of the secondary is accomplished by sample and hold circuits attached to each secondary coil. While this is an effective way to sample the secondary signal, it involves a large amount of circuitry.

SUMMARY OF THE INVENTION

The position sensor of the present invention utilizes a single pulse to excite the LVDT primary coil as opposed to an AC signal. The pulse is transmitted to a linear variable differential transducer having a primary coil, a secondary coil and a movable core member. When the pulse is introduced to the primary coil, an induced pulse is created at the secondary coil, due to the primary and secondary being magnetically coupled to one another by the movable core member. The magnetic coupling between the primary coil and the secondary coil is dependent upon the position of the movable core member. The position sensor further has a voltage measurement means for determining the magnitude of the induced voltage signal created at the secondary coil and outputting a digital signal representative of the magnitude of the induced voltage signal.

An object of this invention is to reduce the power required for position sampling by causing the LVDT to be excited only when position measurements are required. This eliminates the need for constant excitation of the LVDT primary. A further object of the present invention is to provide for position measurement while using very simple circuitry.

A further object of the present invention is to provide a system that allows for monitoring of product and/or part failures. Such system checking enables the device to indicate when failures have occurred so that erroneous readings can be disregarded and maintenance can be performed when necessary.

Another object of the present invention is to provide a system that can operate free from noise caused by electro magnetic interference (EMI), distortion due to filtering connections and other noise problems inherent in the linear variable differential transducer.

BRIEF DESCRIPTION OF THE DRAWINGS

Further objects of the present invention will become apparent from the following detailed description in conjunction with the drawings in which.

DETAILED DESCRIPTION OF THE INVENTION

Figure 1:
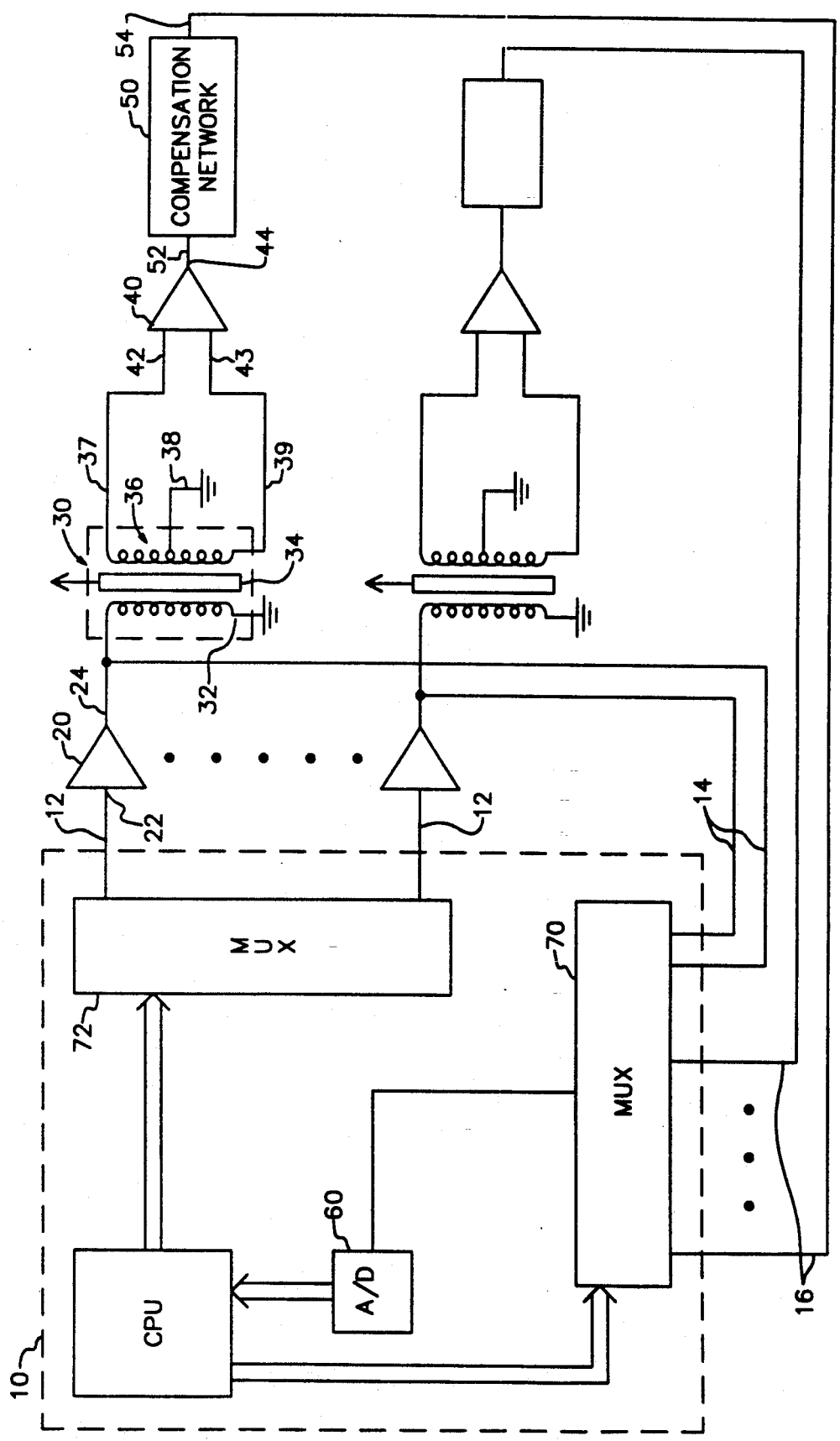
FIG. 1 schematically represents the circuitry of the present invention including a linear variable differential transducer.

The position sensor of FIG. 1 has a plurality of linear variable differential transformers (LVDT's) to sense the position of a number of elements. The operation of the circuit will be described with reference to a single LVDT, however it is understood that the principles of the present invention could be implemented using a large number of LVDT sensors.

As seen in FIG. 1, the position sensor of the present invention has a pulse generation means such as a microcontroller or an other processing element with associated I/O peripherals 10, having an output 12 and a pair of inputs 14, 16. Output 12 is electrically connected to an amplifier 20. More specifically output 12 is connected to the input 22 of amplifier 20. The output 24 of amplifier 20 is then connected to both a microcontroller input 14 and the primary coil 32 of a variable differential transformer 30. Variable differential transformer 30 could be either a rotational variable differential transformer or a linear variable differential transformer. In the configuration shown a linear variable differential transformer 30 (LVDT 30) is used.

LVDT 30 has a primary coil 32, a movable core member 34 and a secondary coil 36. Primary coil 32 of LVDT 30 is magnetically coupled to secondary coil 36 by movable core member 34. The amount of coupling is dependent upon the position of movable core member 34. Secondary coil 36 has three terminals 37, 38, 39 attached thereto, a first terminal 37, connected to one end of the coil, a second terminal 39, connected to the opposite end of the coil, and a center terminal 38, connected to the center of the coil. Alternatively, the secondary could have two coils with four terminals, two of them connected together at 38. In the unmonitored configuration, the center terminal 38 is connected to a ground point while first terminal 37 and second terminal 39 are electrically connected to a first input 42 and a second input 43, respectively, of a second amplifier 40.

The output 44 of second amplifier 40 is electrically connected to the input 52 of a compensation network 50. The output 54 of compensation network 50 is then electrically connected to microcontroller input 16.

Figure 2:
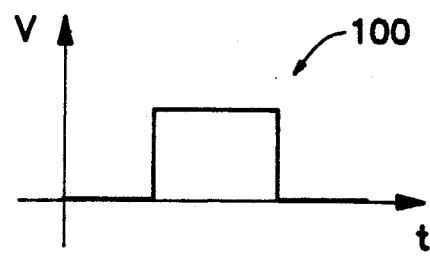
FIG. 2 graphically represents the pulse produced at a microprocessor output for initiating a position measurement.
Figure 3:
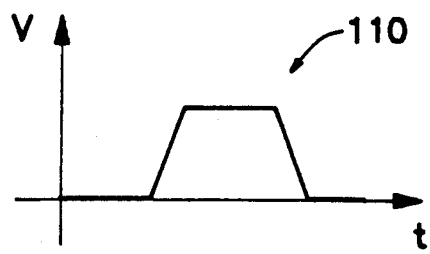
FIG. 3 graphically represents the pulse produced by an integrator in response to the pulse of FIG. 2.

When the position of the associated element is desired microcontroller 10 generates a pulse 100, shown in FIG. 2, at output 12. Generally pulse 100 is a square wave pulse. Pulse 100 generated by microcontroller 10 is transmitted to standard amplifier having a low slew rate. Therefore when the pulse 100 is received at amplifier input 22, a pulse 110, shown in FIG. 3, is generated at amplifier output 24 having voltage transitions occurrinq over a period of time. Therefore amplifier 20 transforms the square wave pulse 100 into pulse 110 having a noise minimizing trapezoidal shape.

Figure 4:
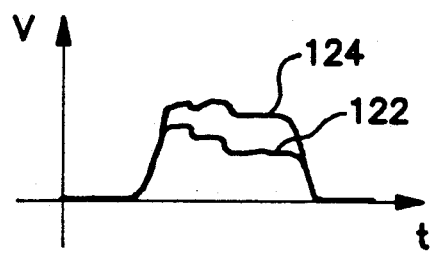
FIG. 4 graphically represents the two induced pulses present at the transducer secondary following the introduction of the pulse of FIG. 3 to the primary.

The trapezoidal shaped pulse is then communicated to primary coil 32 of LVDT 30. As previously mentioned secondary coil 36 of LVDT 30 is magnetically coupled to primary coil 32 by movable core member 34. The amount of magnetic coupling is dependent on the position of movable core member 34. A pair of induced pulses 122, 124, shown in FIG. 4, are created at secondary coils 36 as a result of trapezoidally shaped pulse 120 transmitted to primary coil 32. Induced pulses 122, 124 at secondary coil 36 will be attenuated based on the position of movable core member 34.

The trapezoidal shaped pulse created by amplifier 20 is also transmitted to a first input 14 of microcontroller 10. First input 14 is internally connected to an A to D converter 60 within microcontroller 10. A to D converter 60 measures the magnitude of the trapezoidal shape pulse present at primary coil 32 of LVDT 30.

Figure 5:
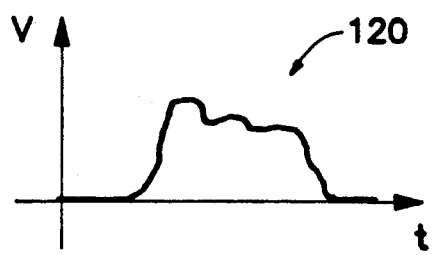
FIG. 5 graphically represents the pulse at the summing amp output.

Secondary coil 36 has three contacts 37, 38 and 39 connected thereto. The center contact 38 is connected to a reference (ground) and the signal contacts 37, 39 are connected to the inputs 42, 43 of a differential amplifier 40. Due to the arrangement of secondary coil 36, actually two induced pulses 122, 124 are created. A first pulse 122 is induced between first contact 37 and center contact 38, and a second pulse 124 is induced between second contact 39 and center contact 38. First pulse 122 and second pulse 124 are separated components of a total induced pulse. Differential amplifier 40 has an output 44 capable of producing a signal pulse 120, shown in FIG. 5, having a magnitude equal to the difference of the two pulses 122, 124 induced at secondary coil leads 37, 39.

Figure 6:
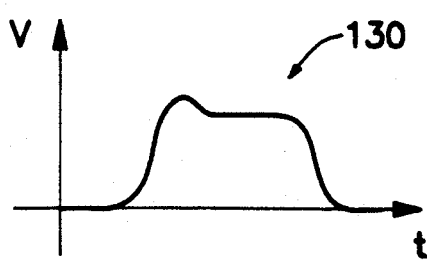
FIG. 6 graphically represents the pulse produced by the network.

Differential amplifier output 44 is electrically connected to the input 52 of compensation network 50. Compensation network 50 adjusts the form of the signal wave to eliminate the effects of noise. Such noise is created from distortion caused by the filtering connection line inductances, or internal/external electrical disturbances. Output 54 of compensation network 50 produces a substantially distortion free pulse 130, shown in FIG. 6 which is communicated to microcontroller input 16. Microcontroller input 16 has an internal connection to an A to D converter 60 via a multiplexer 70, all within microcontroller 10.

Note that microcontroller 10 contains two multiplexers 70 and 72, which gives microcontroller 10 the ability to select which outputs and inputs to use. This provides the ability to operate a plurality of linear variable differential transducers from a single microcontroller.

Referring again to FIG. 1, microcontroller 10 samples the trapezoidal input pulse 110 on input 14 immediately prior to sampling the compensation network output pulse 130 on input 16. By measuring the magnitude of these two pulses and dividing the magnitude of the output pulse by the magnitude of the input pulse, a ratio that is proportional to the amount of attenuation caused by the position of movable core member 34 within LVDT 30 is calculated. Once this ratio is calculated, further calculations can be done to determine the position of movable core member 34.

Movable core member 34 is often physically connected to some type of element requiring position measurement. Examples of these elements include the flaps on an aircraft, the position of a hydraulic actuator and the position of a control stick.

It is important to note that the sampling of the compensation network output pulse is not done until a predetermined timing delay has occurred. This timing delay allows the output pulse to "settle" thus eliminating problems of ringing and noise.

It is also important to note that the use of a trapezoidal shaped input pulse has considerable advantages. First problems with electro magnetic interference are reduced. Second, the problem of ringing occurring within the lines is also reduced. And lastly, by allowing voltage transitions to occur over some period of time causes the LVDT to operate in a more linear fashion.

Figure 7:
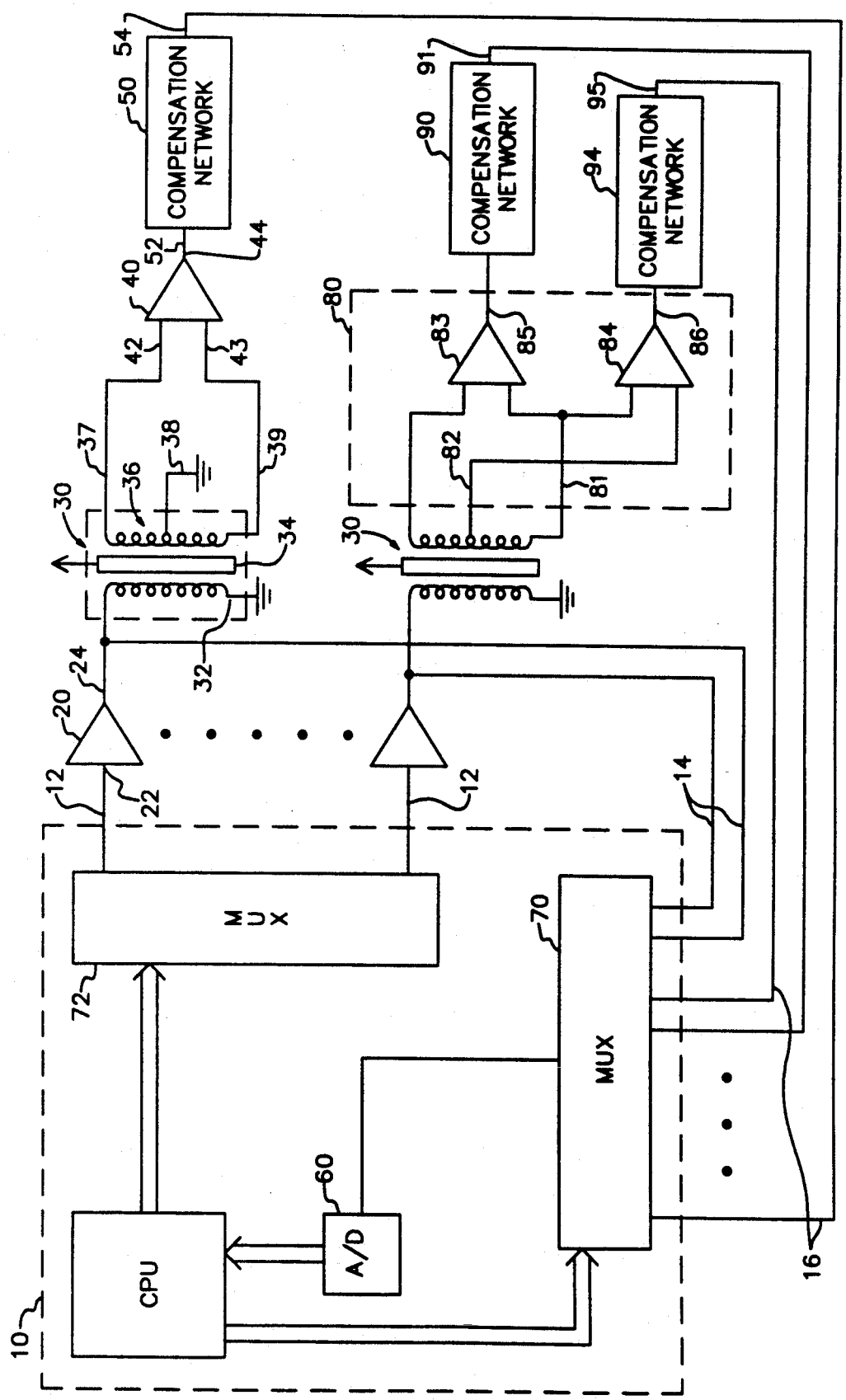
FIG. 7 schematically represents the circuitry of the present invention wherein the circuitry may allow for fault checking.

The described invention is also amenable to fault monitoring of the LVDT output path. As shown in FIG. 7, by connecting terminal 82 (identical to terminal 38 in FIG. 1) and one other output terminal 81 to a second amplifier 84, the resulting second amplifier output 86 may be used in conjunction with the original output 85 (identical in form to 44 in FIG. 1) to detect faults in LVDT 30 and associated electronics. Connected to outputs 85 and 86 of amplifier 83 and second amplifier 84 are compensation networks 90, 94. Compensation networks 90, 94 are the same as compensation network 50 in FIG. 1, and thus operate the same. The outputs 91, 95 of compensation networks 90, 94 are connected to inputs 16 of microcontroller 10.

If output 91 of compensation network 90 is added to two times output 95 of compensation network 94 and is equal to a predetermined constant value, the sensory path is functional. If it exceeds or is less than a tolerance, the path is declared failed.

Having illustrated and described the principles of the invention in the preferred embodiment it should be apparent to those skilled in the art that the invention can be modified in arrangement and detail without departing from such principles. We claim all modifications coming within the scope and spirit of the following claims.

What is claimed is:

1. A position sensor system, comprising:
   means for producing an input pulse;
   a first multiplexing means for receiving the input pulse and transmitting the input pulse to one of a plurality of multiplexing means outputs;
   a plurality of variable differential transducers each electrically connected to one of the first multiplexing means outputs, each of the variable differential transducers having an input means, an output means and a movable core member, said input means for receiving said input pulse and said output means for producing an output pulse having a magnitude representative of the position of said movable core member;
   a plurality of compensation means each electrically connected to one of the output means of said plurality of variable differential transducers for eliminating the effects of distortion and for producing a substantially distortion free output pulse;
   a second multiplexing means with a plurality of inputs each electrically connected on one of said compensation means for receiving and transmitting the compensation means output pulse; and
   voltage measurement means electrically connected to said second multiplexing means for receiving the compensation means output pulse, determining the magnitude of the compensation means output pulse, and producing a digital signal representative of the compensation means output pulse magnitude.

2. The position sensor system of claim 1 wherein said input pulse is a trapezoidal shaped pulse.

3. The position sensor system of claim 1, wherein said means for producing said input pulse is a microcontroller output electrically connected to an amplifier.

4. The position sensor system of claim 1 wherein said voltage measurement means is an A/D converter.

5. A position sensor system, comprising:
   signal generation means having an output for producing a square pulse at said output;
   first multiplexing means electrically connected to said signal generation means for receiving the square pulse and transmitting the square pulse to one of a plurality of first multiplexing means outputs;
   a plurality of drive means each electrically connected to one of the first multiplexing means outputs for causing voltage transitions of said square pulse to occur over a finite period of time, thus transforming said square pulse to a trapezoidal pulse;
   a plurality of transducer means, each having an input, an output, and a movable core member, said input electrically connected to one of said plurality of drive means, said transducer means for producing a pulse at said output proportional to said trapezoidal pulse, wherein the ratio of said input pulse to said output pulse is indicative of the position of said movable core member;
   a plurality of compensation means each electrically connected to one of the outputs of said transducer means for receiving said transducer output pulse, substantially eliminating all noise in said transducer output pulse, and producing a pulse at an output still indicative of the position of said movable member;
   a second multiplexing means, with a plurality of inputs each electrically connected to one of said compensation means, for receiving and transmitting the compensation means output pulse; and
   voltage measurement means electrically connected to said second multiplexer means for determining the magnitude of said compensation means output pulse and producing a position signal indicative of the position of said movable core member.

6. The position sensor system of claim 5 wherein said signal generation means is a microcontroller having an output terminal capable of producing said output pulse.

7. The position sensor system of claim 5 wherein said pulse generation means produces a pulse only when measurement of the movable core member position is desired.

8. A position system comprising:
   means for producing an input pulse;
   a first multiplexing means for receiving the input pulse and transmitting the input pulse to one of a plurality of multiplexing means outputs;
   a plurality of variable differential transducers each electrically connected to one of the first multiplexing means outputs, each of the variable differential transducers having an input means, an output means and a movable core member, said input means for receiving said input pulse and said output means for producing an output pulse having a magnitude representative of the position of said movable core member;
   a plurality of compensation means each electrically connected to one of the output means of said plurality of variable differential transducers for eliminating the effects of distortion and for producing a substantially distortion free output pulse;
   a second multiplexing means with a plurality of inputs each electrically connected to one of said compensation means for receiving and transmitting the compensation means output pulse;
   voltage measurement means electrically connected to said second multiplexing means for receiving the compensation means output pulse, determining the magnitude of the compensation means output pulse, and producing a digital signal representative of the compensation means output pulse magnitude; and
   a plurality of means for fault monitoring each electrically connected to one of said output means of said variable differential transducer, wherein means for fault monitoring can produce a signal indicating if said variable differential transducer has failed.

* * * * *